US010003105B2

(12) United States Patent
Cho et al.

(10) Patent No.: US 10,003,105 B2
(45) Date of Patent: Jun. 19, 2018

(54) BATTERY MODULE HAVING IMPROVED SAFETY

(71) Applicant: SAMSUNG SDI CO., LTD., Yongin-si, Gyeonggi-do (KR)

(72) Inventors: Jun-Woo Cho, Yongin-si (KR);
Tae-Yong Kim, Yongin-si (KR);
Jong-Han Rhee, Yongin-si (KR);
Shi-Dong Park, Yongin-si (KR);
Young-Deok Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 516 days.

(21) Appl. No.: 14/671,997

(22) Filed: Mar. 27, 2015

(65) Prior Publication Data

US 2015/0295280 A1    Oct. 15, 2015

(30) Foreign Application Priority Data

Apr. 11, 2014   (KR) .......................... 10-2014-0043697

(51) Int. Cl.
*H01M 10/42* (2006.01)
*H01M 2/20* (2006.01)

(52) U.S. Cl.
CPC ......... *H01M 10/425* (2013.01); *H01M 2/206* (2013.01); *H01M 10/4207* (2013.01)

(58) Field of Classification Search
None
See application file for complete search history.

(56) References Cited

U.S. PATENT DOCUMENTS

| 5,999,410 A | * | 12/1999 | Weiler | H01M 2/1022 307/150 |
| 2009/0111007 A1 | * | 4/2009 | Naganuma | H01M 2/1077 429/82 |
| 2011/0008667 A1 | * | 1/2011 | Kwag | H01M 2/105 429/123 |
| 2011/0268999 A1 | | 11/2011 | Nagai | |
| 2014/0141301 A1 | * | 5/2014 | Aoki | H01M 10/482 429/90 |

FOREIGN PATENT DOCUMENTS

| KR | 10-2011-0043515 A | 4/2011 |
| KR | 10-2013-0051627 A | 5/2013 |

* cited by examiner

*Primary Examiner* — Ula C Ruddock
*Assistant Examiner* — Tony S Chuo
(74) *Attorney, Agent, or Firm* — Lewis Roca Rothgerber Christie LLP

(57) ABSTRACT

A battery module includes a plurality of battery cells, a busbar holder on the battery cells, the busbar holder having a plurality of busbars coupling neighboring battery cells of the plurality of battery cells to each other, and a circuit board on the busbar holder and defining a plurality of fastening openings along its perimeter. The circuit board is coupled to the busbar holder with a plurality of fastening members coupled to first fastening openings defined on the busbar holder. The circuit board has a component for controlling and monitoring recharging and discharging of the battery cells coupled to the circuit board.

10 Claims, 3 Drawing Sheets

BATTERY MODULE HAVING IMPROVED SAFETY

CROSS-REFERENCE TO RELATED APPLICATION

This application claims priority to and the benefit of Korean Patent Application No. 10-2014-0043697, filed on Apr. 11, 2014, in the Korean Intellectual Property Office, the entire contents of which are incorporated herein by reference.

BACKGROUND

1. Field

Aspects of the present invention are related to a battery module.

2. Description of the Related Art

Recently, high-output battery modules with high-energy density using a non-aqueous electrolyte have been developed. Such high-output battery modules achieve a high voltage or a high capacity by connecting a plurality of battery cells in parallel or in series for use, for example, in driving a motor of a device requiring high power, such as an electric vehicle.

As the number of devices employing such battery modules increases, further research into improvement on productivity of these battery modules must be conducted. Moreover, as the appearance of devices utilizing these battery modules is diversified, it also may be necessary to diversify the shape of these corresponding battery modules.

However, the safety of these battery modules is of primary concern. Thus, research is directed toward a structure of these battery modules which is capable of satisfying all of the above-mentioned conditions and characteristics.

SUMMARY

Aspects of the present invention are directed toward a battery module capable of preventing separation of a circuit board on which important components of the battery module are mounted, after the circuit board has been assembled.

Other and further aspects and embodiments of the present invention will become apparent from the following summary and detailed description.

According to aspects of the present invention, a battery module includes a plurality of battery cells, a busbar holder on the battery cells, the busbar holder having a plurality of busbars coupling neighboring battery cells of the plurality of battery cells to each other, and a circuit board on the busbar holder and defining a plurality of fastening openings along its perimeter. The circuit board is coupled to the busbar holder with a plurality of fastening members coupled to first fastening openings defined on the busbar holder.

The busbar holder may further define fastening apertures corresponding to the first fastening openings of the circuit board. The fastening members may be coupled to the bus bar at the fastening apertures via the first fastening openings.

The busbar holder may further include a fastening protrusion extending from a position corresponding to a second fastening opening defined in the circuit board.

The second fastening opening of the circuit board may be configured to be coupled to the fastening protrusion.

The fastening protrusion may have a hook shape.

The plurality of fastening members may be bolts and the fastening apertures may be nuts.

The circuit board may further define a reduced-strength portion including the second fastening opening configured to separate from the circuit board.

The circuit board may include a printed circuit pattern for controlling and monitoring recharging and discharging of the battery cells. The printed circuit pattern may be located within the area of the circuit board defining the second fastening opening.

The reduced-strength portion may include perforations defining a perforated line.

The reduced-strength portion may include a non-penetrated concave portion.

The reduced-strength portion may include perforations defining a perforated line and a non-penetrated concave portion.

The plurality of busbars may include fastening apertures corresponding to the first fastening openings of the circuit board. The plurality of fastening members may pass through the first fastening openings of the circuit board and the fastening apertures of the plurality of busbars to be coupled to the respective fastening apertures of the busbar holder.

As may be apparent from the above description, embodiments of the present invention are directed toward a battery module capable of preventing an undesirable separation of a circuit board, after the circuit board on which important components of the battery module are mounted, has been assembled.

BRIEF DESCRIPTION OF THE DRAWINGS

Example embodiments of the present invention will now be described in greater detail with reference to the accompanying drawings. However, aspects of the present invention may be embodied in different forms or types and should not be construed as limited to the embodiments set forth herein. Rather, these embodiments are provided for thoroughness and completeness of this disclosure, and to fully convey the scope of the example embodiments and their equivalents to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
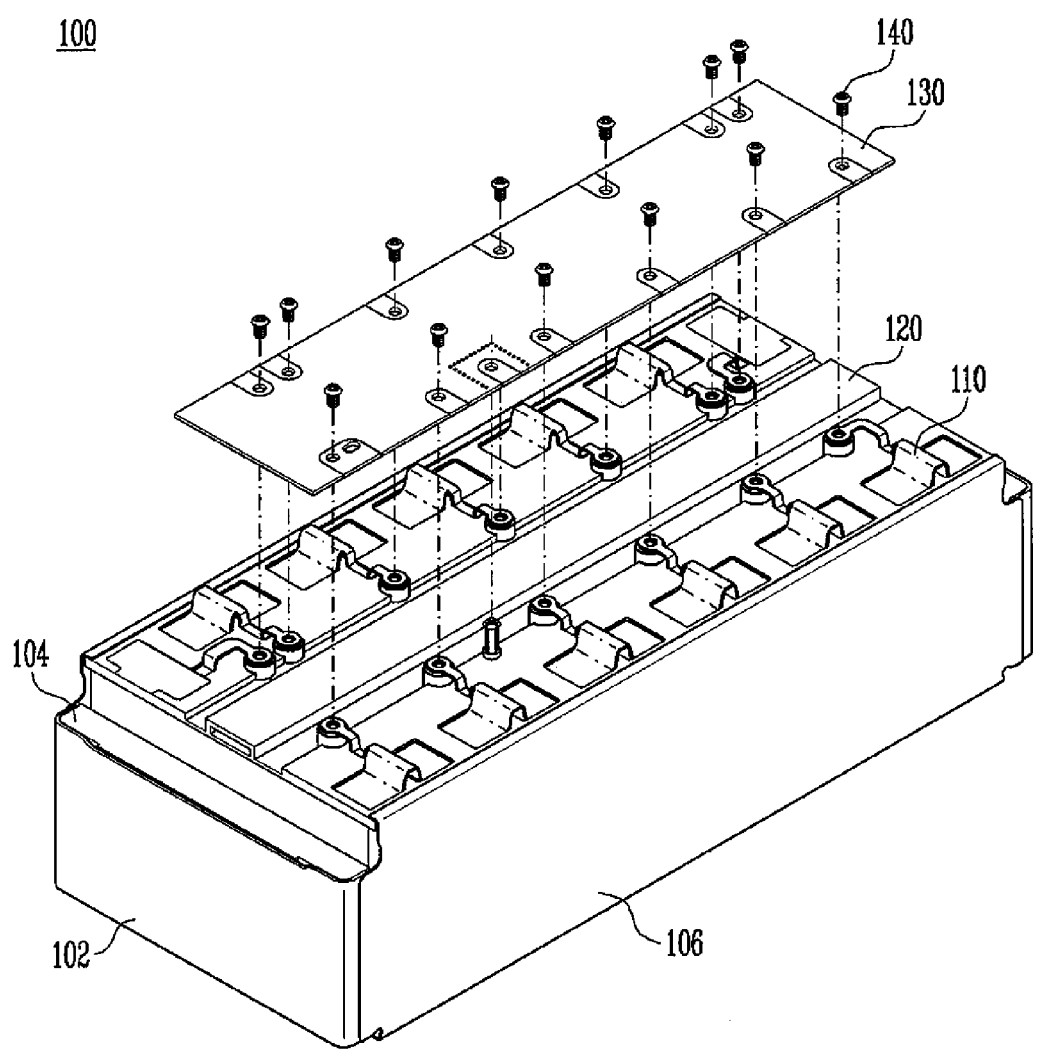
FIG. 1 is an exploded perspective view of a circuit board and a busbar holder of a battery module according to an embodiment of the present invention.

Aspects of the present invention will be described more fully hereinafter with reference to the accompanying drawings, in which example embodiments of the inventions are shown. Although embodiments of the present invention are disclosed for illustrative purposes, those skilled in the art will appreciate that various modifications, additions, subtractions, and substitutions are possible without departing from the spirit and scope of the present invention. Further, like reference numerals are used to identify like elements throughout.

Generally, circuit boards, on which components for controlling and monitoring the actuating signal and state of a battery cell, are coupled, for example, mounted or fastened, to a battery module, for example, using a bolt.

The circuit board may be a cell module control (CMC) board, in an example. This CMC board may measure the voltage and temperature of battery cells, provide the measured information to an exterior of the battery cell, and perform voltage balancing.

Since vital components for controlling and monitoring the state of the battery are coupled or mounted on the circuit board, in these embodiments, it is desirable to prevent the circuit board from being undesirably separated, for example, by a user, after the circuit board has been assembled. Moreover, it may be necessary to prevent the circuit board from being replaced with a defective product, for example, during mass production of the battery modules and cells.

However, conventional fastening methods are often problematic in that the circuit board may be easily separated from the battery module or cell, for example, merely by loosening the bolt coupling the circuit board to the battery module or cell.

According to embodiments of the present invention, it is possible to prevent or reduce the chance of the undesirable separation of the circuit board, after assembly of the circuit board, on which the important components of the battery module are mounted. Accordingly, the configuration of a battery module according to embodiments of the present invention will be described in further detail with reference to FIGS. 1 through 5.

FIG. 1 is an exploded perspective view of a circuit board 130 and a busbar holder 120 of a battery module 100 according to an embodiment of the present invention.

Figure 2:
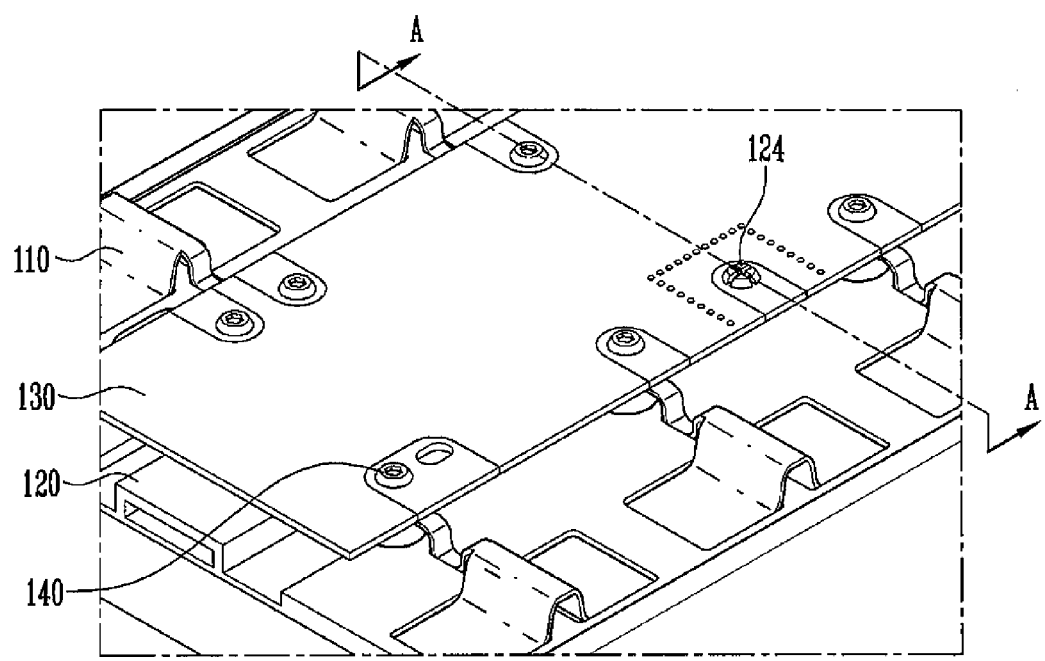
FIG. 2 is an enlarged perspective view of the battery module according to the embodiment illustrated in FIG. 1 with the circuit board coupled to the busbar holder.

FIG. 2 is an enlarged perspective view of the battery module 100 according to the embodiment illustrated in FIG. 1 with the circuit board 130 coupled to the busbar holder 120.

Figure 3:
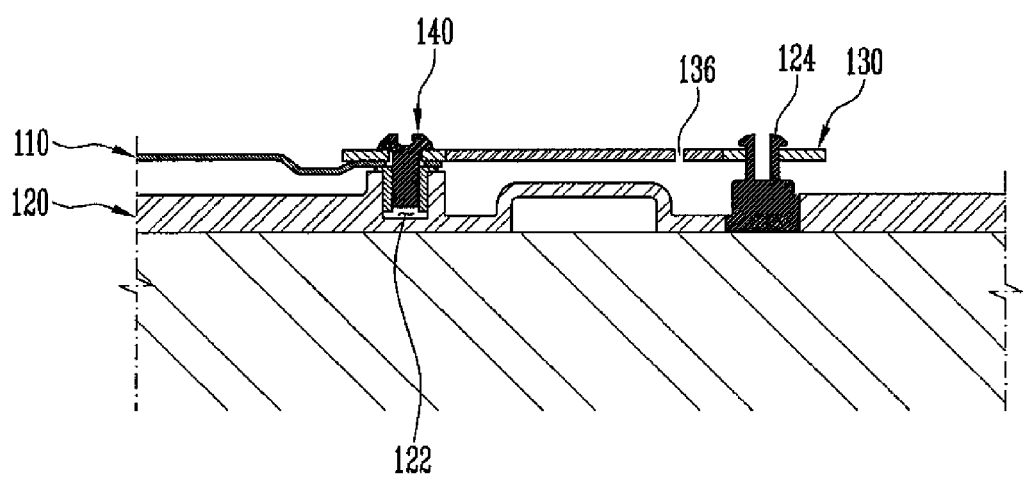
FIG. 3 is a cross-sectional view of the battery module taken along the line A-A of FIG. 2.

FIG. 3 is a cross-sectional view of the battery module 100 taken along the line A-A of FIG. 2.

Figure 4:
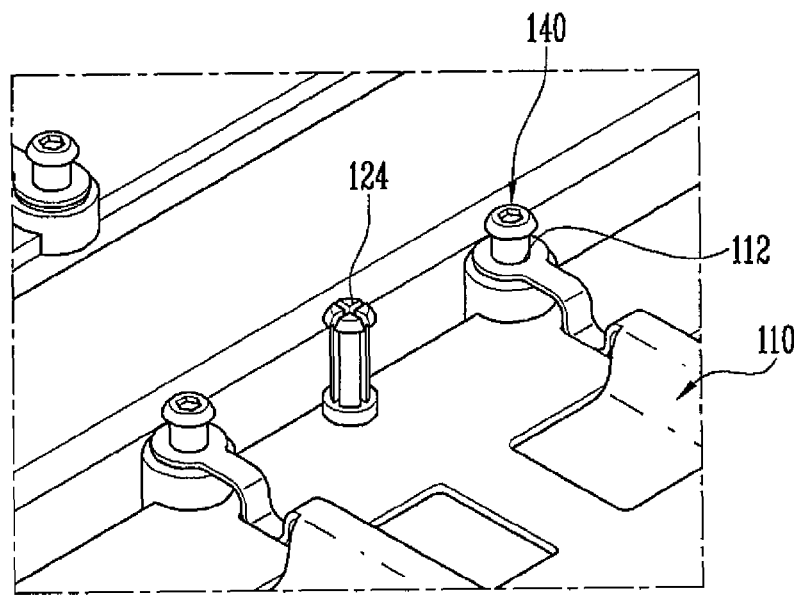
FIG. 4 is an enlarged perspective view of the battery module according to the embodiment illustrated in FIG. 1 with the circuit board removed, for convenience of description.
Figure 5:
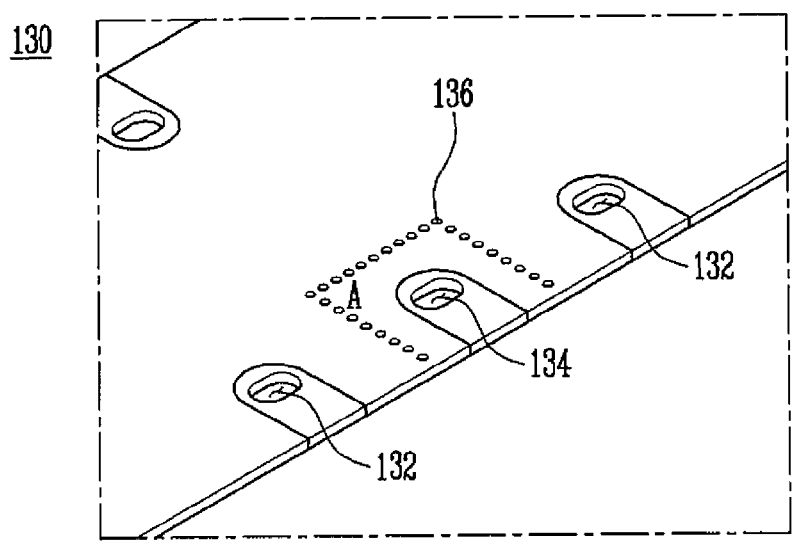
FIG. 5 is an enlarged perspective view of the circuit board of the battery module according to the embodiment illustrated in FIG. 1.

FIG. 4 is an enlarged perspective view of the battery module 100 according to the embodiment illustrated in FIG. 1 with the circuit board 130 removed, for convenience of description, and FIG. 5 is an enlarged perspective view of the circuit board 130 of the battery module 100 according to the embodiment illustrated in FIG. 1.

As shown in FIGS. 1 through 5, the battery module 100 according to an embodiment of the present invention may include battery cells, a busbar holder 120, a circuit board 130, and a plurality of fastening members 140.

The battery cell, according to an embodiment, is an energy generating device. According to an embodiment, a plurality of battery cells may be aligned or arranged along a direction.

The battery cell may include a battery case with an opening at a top thereof, and an electrode assembly and electrolyte that are accommodated in the battery case. In this embodiment, the electrode assembly and the electrolyte may electrochemically react with each other to generate energy, and the battery case may be sealed by a cap assembly. Further, electrode terminals having different polarities, namely, a positive terminal and a negative terminal, may be on the top of the battery cell, for example, protruding out from the battery cell. The battery cell may further include a vent, the vent serving as a passage for discharging gas out of the battery cell.

The busbar holder 120, in an embodiment, is positioned above the battery cells. The busbar holder 120, in this embodiment, includes a plurality of busbars 110 that electrically connect or couple the battery cells to each other.

The busbars 110, in an embodiment, connect or couple electrode terminals of neighboring battery cells to each other, thus connecting or coupling the battery cells in series or in parallel. The busbars 110 may be secured or coupled to the electrode terminals of the battery cell by welding or the like. In this embodiment, the busbars 110 are secured or fixed by the busbar holder 120.

The busbar holder 120, in an embodiment, is configured to hold or secure the busbars 110. The busbar holder 120 may be made of an insulating material to prevent a short circuit from occurring between the busbar holder 120 and the battery cells.

In an embodiment, the busbar holder 120 may have a size sufficient to completely extend over tops of the battery cells. In an embodiment, a gas passage may be formed in the busbar holder 120 for discharging gas out of the vent of the battery cell.

The battery module 100 according to an embodiment may further include an end plate 102, an end block 104, and a side plate 106.

The end plate 102, according to an embodiment, is positioned exterior to an outermost battery cell of the plurality of battery cells of the battery module 100. The end plate 102 may support the plurality of battery cells in along their direction of alignment direction, together with the end block 104.

In an embodiment, the end plate 102 may be made of a metal material, for example, to provide sufficient rigidity to the battery module 100. In an embodiment, a pair of end plates 102 may be located, one each along a width of each outermost battery cell. In this embodiment, the pair of end plates 102 together with side plates 106 connecting or coupling the pair of end plates 102 to each other may constitute a housing of the battery module 100, configured to protect the battery cells.

In an embodiment, the end block 104 is between each end plate 102 and each outermost battery cell. The end plates 102 may have a bent shape to protect the respective end block 104, and each end plate 102 may be coupled to the side plates 106 via a bent portion, for example, by a welding process or a similar process.

The end block 104, in an embodiment, is between each end plate 102 and the respective outermost battery cell. The end block 104 may support the plurality of battery cells along their direction of alignment together with the end plates 102.

The end block 104, in an embodiment, may be made of a material that is different in physical properties from that of the end plate 102. Since the end block 104 may be brought into contact with the outermost battery cell, according to an embodiment, the end block 104 may be made of an insulating material that may reduce or prevent the risk of short circuit. Further, the end block 104 may include a pair of end blocks 104 to correspond with the pair of end plates 102.

The circuit board 130, according to an embodiment, is positioned above the busbar holder 120, the circuit board 130 having components for controlling and monitoring the recharging and discharging of the battery cells mounted on or coupled to the circuit board 130.

The circuit board 130 according to an embodiment includes a plurality of fastening openings 132 and 134 defined along its perimeter. The circuit board 130, according to an embodiment is coupled or fastened to the busbar holder 120 by lining up the plurality of fastening members 140 with at least some of the fastening openings 132 and 134, for example, at least the first fastening openings 132, to couple the fastening members 140 to the fastening openings 132 and 134.

The busbar holder 120, according to this embodiment, may include fastening apertures 122 defined at positions corresponding to the first fastening openings 132 of the circuit board 130.

In this embodiment, the fastening members 140 pass through the first fastening openings 132 to be coupled or fastened to respective fastening apertures 122 of the busbar holder 120, such that the circuit board 130 may be secured or coupled to the busbar holder 120.

Further, according to an embodiment, the plurality of busbars 110 on the busbar holder 120 may also include fastening apertures 112 at positions corresponding to the first fastening openings 132. In this embodiment, the fastening members 140 may pass through the first fastening openings 132 and the fastening apertures 112 of the busbars 110 to be fastened or coupled to the fastening apertures 122 of the busbar holder 120.

The fastening members 140 and the fastening apertures 122, according to an embodiment of the present invention, may have a bolt and nut structure.

In an embodiment, the busbar holder 120 may further include a fastening protrusion 124 that protrudes or extends upwards to correspond to the second fastening opening 134.

Thus, according to this embodiment, the busbar holder 120 includes fastening apertures 122 defined at positions corresponding to the first fastening openings 132, and the busbar holder 120 includes a fastening protrusion 124 extending from a position corresponding to the second fastening opening 134.

As will be described in further detail below, the second fastening opening 134 and the fastening protrusion 124, according to an embodiment, are configured to be easily fractured or ruptured allowing the circuit board 130 to be separated from the battery module 100 after the assembly has been completed. Thus, in an embodiment, only one pair of the second fastening opening 134 and the fastening protrusion 124 may be included. However, the present invention is not limited thereto, and two or more pairs of second fastening openings 134 and fastening protrusions 124 may also be included.

The fastening protrusion 124, according to an embodiment, may be fitted into or coupled to the second fastening opening 134 of the circuit board 130. In this embodiment, such a configuration may provide an additional force for securing or coupling the circuit board 130 to the busbar holder 120.

In order to prevent or reduce the likelihood that the circuit board 130 is undesirably separated by a user after the assembly has been completed, the fastening protrusion 124 of the busbar holder 120 according to an embodiment of the present invention may have a hook shape, for example, as shown in FIG. 4.

In this embodiment, when the hook-shaped fastening protrusion 124 of the busbar holder 120 is fitted into or coupled to the second fastening opening 134 of the circuit board 130, the fastening protrusion 124 is fixedly caught by or coupled to the second fastening opening 134. Thus, as long as the fastening protrusion 124 or the second fastening opening 134 is not fractured or ruptured, it becomes extremely difficult to separate the circuit board 130 from the busbar holder 120 once the hook-shaped fastening protrusion 124 is coupled to the second fastening opening 134.

As shown in the embodiment illustrated in FIG. 4, the hook-shaped fastening protrusion 124 may have a shank that protrudes or extends upwards from a top of the busbar holder 120, and a head on an upper end of the shank, the head being larger than the shank. In order to increase elasticity for fastening or coupling, a plurality of shanks may be spaced apart from each other at intervals, according to an embodiment.

However, embodiments of the present invention are not limited thereto. The fastening protrusion 124 may have any shape suitable for making the separation of the fastening protrusion 124 from the second fastening opening 134 difficult once the fastening protrusion 124 has been fitted into or coupled to the second fastening opening 134.

In an embodiment, in order to allow the fastening protrusion 124 or the second fastening opening 134 to be easily fractured or ruptured when an attempt to separate the circuit board 130 from the battery module 100 is made after the assembly has been completed, the circuit board 130 may further include a reduced-strength portion 136 configured to separate an area A of the circuit board 130 having the second fastening opening 134 from the circuit board 130.

The reduced-strength portion 136 is configured to be fractured or ruptured when an external force acting thereon exceeds a predetermined or set level, according to an embodiment. As shown in the embodiment illustrated in FIG. 5, the reduced-strength portion 136 may be defined by a plurality of perforations (e.g., a perforated line) for dividing the area A of the circuit board 130 in which the second fastening opening 134 is defined from a remaining area.

However, the reduced-strength portion 136 is not limited to the above-mentioned shape and may have the shape of a non-penetrated concave portion, in an embodiment. Alternatively, the reduced-strength portion 136 may be defined by a combination of the perforations in the shape of the perforated line and the non-penetrated concave portions.

According to this embodiment, when an attempt is made to separate the circuit board 130 after assembly has been completed, the external force exceeding the predetermined or set level may be applied to the fastening protrusion 124 or the second fastening opening 134, and thereby the area A including the second fastening opening 134 may be separated from the circuit board 130. In this embodiment, in order to hinder the normal operation of the battery module 100, a printed circuit pattern of the circuit board 130 may pass through the area A having the second fastening opening 134.

Thus, in this embodiment, the printed circuit pattern for controlling and monitoring recharging and discharging of the battery cells may pass through the area A of the circuit board 130 defining the second fastening opening 134. For example, a pattern connected to a battery-cell-voltage measuring sensor may pass through the area A defining the second fastening opening 134.

Therefore, when a user attempts to separate the circuit board 130 from the busbar holder 120 after assembly has been completed, the configuration of the battery module 100, according to embodiments of the present invention, allows the area A of the circuit board 130 having the second fastening opening 134 to be easily fractured or ruptured. The breaking of the area A, according to these embodiments, causes the pattern connected to the battery-cell-voltage measuring sensor to be cut, thus hindering the normal operation of the battery module 100. Consequently, it may be possible to completely prevent the circuit board 130 from being undesirably separated from the busbar holder 120 after assembly has been completed, according to embodiments of the present invention.

In an embodiment, the circuit board 130 is secured or coupled to the busbar holder 120. In this embodiment, the circuit board 130 is secured or coupled to the busbar holder 120 via the plurality of fastening openings 132 and 134 of the circuit board 130, wherein the plurality of fastening members 140, are coupled to the first fastening holes 132, and the fastening protrusion 124 protruding or extending from the busbar holder 120 is coupled in the second fastening opening 134 of the circuit board 130.

In an embodiment, the fastening protrusion 124 is coupled to the second fastening opening 134 in a hook-coupling method so that the fastening protrusion 124 cannot be easily separated from the second fastening opening 134. However, if an external force exceeding a predetermined or set level is applied to the fastening protrusion 124 and the second fastening opening 134, the circuit board 130, according to an embodiment, may rupture or fracture along the reduced-strength portion 136. Thus, an attempt to separate the circuit board 130 from the busbar holder 120 may be possible to confirm.

Further, the printed circuit pattern for controlling the battery module 100 may pass through the area A of the circuit board 130 in which the second fastening opening 134 is defined, according to an embodiment. Thus, if the area A of the circuit board 130 defining the second fastening opening 134 is fractured or ruptured along the reduced-strength portion 136, normal operation of the battery module 100 may be prevented.

As described above, embodiments of the present invention are intended to provide a battery module 100 capable of preventing an undesirable separation of a circuit board 130 after it has been assembled.

Example embodiments have been disclosed herein, and although specific terms are employed, they are used and are to be interpreted in a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments, unless otherwise specifically or expressly indicated. Accordingly, it will be understood by those of skill in the art that changes in form and details may be made without departing from the spirit and scope of the present invention and as set forth in the following claims.

What is claimed is:

1. A battery module comprising:
a plurality of battery cells;
a busbar holder on the battery cells, the busbar holder comprising a plurality of busbars coupling neighboring battery cells of the plurality of battery cells to each other; and
a circuit board on the busbar holder, the circuit board defining a plurality of fastening openings along its perimeter and a reduced strength portion including one of the fastening openings and configured to separate from the circuit board,
wherein the circuit board is coupled to the busbar holder with a plurality of fastening members coupled to first fastening openings defined on the circuit board.

2. The battery module of claim 1, wherein the busbar holder defines fastening apertures corresponding to the first fastening openings of the circuit board, and
wherein the fastening members are coupled to a respective one of the bus bars at the fastening apertures via the first fastening openings.

3. The battery module of claim 2, wherein the busbar holder further comprises a fastening protrusion extending from a position corresponding to a second fastening opening defined in the circuit board, and
wherein the second fastening opening of the circuit board is configured to be coupled to the fastening protrusion.

4. The battery module of claim 3, wherein the fastening protrusion has a hook shape.

5. The battery module of claim 3, wherein the plurality of fastening members comprise bolts and the fastening apertures comprise nuts.

6. The battery module of claim 1, wherein the circuit board comprises a printed circuit pattern for controlling and monitoring recharging and discharging of the battery cells, the printed circuit pattern being within an area of the circuit board defining the second fastening opening.

7. The battery module of claim 6, wherein the reduced-strength portion includes perforations defining a perforated line.

8. The battery module of claim 6, wherein the reduced-strength portion includes a non-penetrated concave portion.

9. The battery module of claim 6, wherein the reduced-strength portion includes perforations defining a perforated line and a non-penetrated concave portion.

10. The battery module of claim 3, wherein the plurality of busbars comprise fastening apertures corresponding to the first fastening openings of the circuit board, and
wherein the plurality of fastening members pass through the first fastening openings of the circuit board and the fastening apertures of the plurality of busbars to be coupled to the respective fastening apertures of the busbar holder.

* * * * *